Patented Jan. 23, 1934

1,944,542

UNITED STATES PATENT OFFICE 1,944,542

CHOLESTERIN ESTER

Max Bockmühl, Frankfort-on-the-Main, and Robert Knoll, Frankfort-on-the-Main-Hochst, Germany, assignors to Winthrop Chemical Company, Inc., New York, N. Y., a corporation of New York No Drawing. Application July 11, 1933, Serial No. 679,982, and in Germany May 23, 1930

3 Claims. (Cl. 260—106)

According to this invention cholesterin esters are obtained by esterifying with cholesterin, by one of the usual methods, a cycloaliphatic carboxylic acid of the type of chaulmoogric acid or the derivatives thereof. The esters thus obtained have a good bactericidal action and are intended to be used particularly in the treatment of lepra.

It is possible to start from the free acids or from the derivatives thereof, for instance their chlorides or esters. The esters thus obtained are readily soluble in acetic acid ester and in ether, insoluble in water and moderately soluble in alcohol and fatty oils.

Chaulmoogric acid esters of aliphatic alcohols and the phenyl and cresyl esters of chaulmoogric acid are known. Only the first-named have proved to be applicable in therapy. The cholesterin esters obtainable by the process of this invention are, however, superior to them with respect to the stopping of the development of lepromes as well as to their curative action. This is shown by the following tests:

24 rats were infected with leprous material. 12 animals remained untreated; the remainder received in series of 6 animals once a week a subcutaneous injection of (a) chaulmoogric acid ethyl ester (b) chaulmoogric acid cholesteryl ester, each animal receiving 21 injections starting 10 weeks after the infection. 8 months after the beginning of the infection all untreated control animals showed strong lepromes, most of which had the size of plums or tomatoes, and which were partly even disintegrated. In the case of (a) all the animals were badly affected; the lepromes, however, were somewhat smaller than those of the control animals, being as large as cherries. In the case of (b) only one of the six animals developed like the control animals; the remaining five showed in the first weeks of observation only small infiltrates, having the size of lentils or almond kernels at the utmost and being, moreover, of a much milder nature. After a year all the control animals had died except one which was still seriously ill, whereas the animals treated with the ethyl ester showed at first cicatrization, and then had relapses. In contradistinction thereto, the animals treated with the product obtainable by the process of this invention showed cicatrization without relapses.

The following examples illustrate the invention:

(1) 25 grams of cholesterin and 75 grams of chaulmoogric acid are heated together in an oil bath for 5 hours to a temperature between 230° C. and 250° C. while introducing carbonic acid. The mixture is allowed to cool to some extent and then mixed with 1½ liters of absolute alcohol. The ester obtained has at first the form of an oil, but solidifies on some standing. By recrystallization from acetic acid ester the chaulmoogric acid cholesteryl ester is obtained in the form of laminæ melting at 68° C.–70° C. The yield amounts to 45 grams (80 per cent. of the theory).

(2) 15 grams of chaulmoogric acid chloride and 23.5 grams of cholesterin in 50 cc. of xylene are heated in a reflux apparatus in an oil bath for 3 hours until no more hydrogen chloride escapes. After distillation of the xylene the liquid is poured into 1 liter of absolute alcohol and the ester which is thus precipitated is further treated in the manner indicated in the preceding example. It melts at 68° C.–70° C. The yield amounts to 23 grams. In the same manner the reaction may be carried out in the presence of a tertiary base.

(3) 10 grams of cholesterin and 30 grams of hydnocarpic acid are heated together in an oil bath for 5 hours to a temperature between 250° C. and 270° C., while passing carbonic acid through the mixture. The mixture is allowed to cool somewhat and then poured into 250 cc. of absolute alcohol. After some time the hydnocarpic acid cholesteryl ester separates in the form of white laminæ. By recrystallization from a mixture of alcohol and acetic acid ester the new compound is obtained in the form of laminæ melting at 63° C.–65° C. The yield amounts to 14 grams.

We claim:

1. The cholesterin esters of acids of the group consisting of chaulmoogric acid and hydnocarpic acid, said compounds being soluble in acetic acid ester and in ether, moderately soluble in alcohol and fatty oils and insoluble in water.

2. The cholesterin ester of chaulmoogric acid, melting at 68° C.–70° C. and being soluble in acetic acid ester and in ether, moderately soluble in alcohol and fatty oils and insoluble in water.

3. The cholesterin ester of hydnocarpic acid, melting at 63° C.–65° C. and being soluble in acetic acid ester and in ether, moderately soluble in alcohol and fatty oils and insoluble in water.

MAX BOCKMÜHL.
ROBERT KNOLL.